(12) United States Patent
Katoh

(10) Patent No.: US 6,940,553 B1
(45) Date of Patent: Sep. 6, 2005

(54) SOLID-STATE CAMERA INCLUDING A CHARGE COUPLED DEVICE

(75) Inventor: Satoshi Katoh, Tokyo (JP)

(73) Assignee: NEC Corporation (JP)

( * ) Notice: Subject to any disclaimer, the term of this patent is extended or adjusted under 35 U.S.C. 154(b) by 442 days.

(21) Appl. No.: 09/013,084

(22) Filed: Jan. 26, 1998

(30) Foreign Application Priority Data

Jan. 28, 1997 (JP) .............................................. 9-013921

(51) Int. Cl.[7] .............................................. H04N 3/14
(52) U.S. Cl. ..................................... 348/311; 348/316
(58) Field of Search ................................. 348/311, 312, 348/313, 314, 315, 316, 317, 318, 319, 320, 321, 322, 323

(56) References Cited

U.S. PATENT DOCUMENTS

| 4,556,910 | A | * | 12/1985 | Tisue ........................... 348/241 |
| 5,452,003 | A | * | 9/1995 | Chamberlain et al. ...... 348/294 |
| 5,541,654 | A | * | 7/1996 | Roberts ....................... 348/301 |
| 5,572,256 | A | * | 11/1996 | Egawa et al. ................ 348/296 |
| 5,784,102 | A | * | 7/1998 | Hussey et al. ............... 348/296 |
| 5,796,361 | A | * | 8/1998 | Levinson ..................... 341/172 |
| 5,949,483 | A | * | 9/1999 | Fossum et al. .............. 348/303 |

FOREIGN PATENT DOCUMENTS

| JP | 61184978 | 8/1986 | ........... H04N/5/335 |
| JP | 61186080 | 8/1986 | ........... H04N/5/335 |
| JP | 1259668 | 10/1989 | ............ H04N/3/15 |
| JP | 418737 | 1/1992 | ......... H01L/21/339 |
| JP | 4100378 | 4/1992 | ............ H04N/1/40 |
| JP | 461978 | 5/1992 | .......... H04N/5/238 |
| JP | 5328227 | 12/1993 | .......... H04N/5/335 |
| JP | 653463 | 2/1994 | .......... H01L/27/14 |
| JP | 6125501 | 5/1994 | .......... H04N/5/335 |

OTHER PUBLICATIONS

Ackland et al., "Camera on a Chip", Feb. 8, 1996, ISSCC96.*

* cited by examiner

Primary Examiner—Wendy R. Garber
Assistant Examiner—Jacqueline Wilson
(74) Attorney, Agent, or Firm—Hayes Soloway P.C.

(57) ABSTRACT

To provide a solid-state image sensor, wherein no field adjustment of timing pulse phases used in the signal processor or of signal balances is needed, and noise performance is more improved, with a simple, miniaturized and economical configuration, a solid-state image sensor (1) of the invention comprises: a CCD (2) configured on a semiconductor chip for generating a CCD signal according to an optical image focused on a sensor area thereof; an on-chip signal processor (4) configured on the semiconductor chip by way of the same fabrication process with the CCD including a noise reduction circuit for eliminating noises from the CCD signal, an AGC circuit for amplifying output of of the noise reduction circuit; and a timing pulse generator (3) configured on the semiconductor chip by way of the same fabrication process with the CCD (2) for generating timing pulses used the on-chip signal processor. The on-chip signal processor (4) of the solid-state image sensor (1) may further comprise an A/D converter for converting output of the AGC circuit into a digital signal.

12 Claims, 6 Drawing Sheets

SOLID-STATE CAMERA INCLUDING A CHARGE COUPLED DEVICE

BACKGROUND OF THE INVENTION

The present invention relates to a solid-state image sensor.

FIG. 8 is a block diagram illustrating a conventional solid-state camera, wherein a charge coupled device (hereafter abbreviated as CCD) is applied, comprising a CCD 91, a signal processor 97, a video processor 98, a CCD driver 92 and a timing signal generator 93.

FIG. 9 is a schematic diagram illustrating a configuration of the CCD 91, wherein an object image is focused on a sensor area (photoelectric transducer section) 100, and converted into electric charges corresponding to intensity of incident light by photo-diodes 101. Generated electric charges are transferred to vertical CCDs 102 through reading transfer gates. The vertical CCDs 102 are driven by vertical transfer pulses $\phi V1$ to $\phi V4$ and transfer the electric charges horizontal CCD 103 in order. The horizontal CCD 103 is driven by horizontal transfer pulses $\phi H1$ and $\phi H2$ and transfers the electric charges to an output amplifier 104 to be output outside, namely, to the signal processor 97 of FIG. 8. To the output amplifier 104, a reset pulse $\phi R$ is supplied for resetting the output amplifier 104 from remaining charge for every pixel (photo-diode).

The signal processor 97 comprises, in general, a noise reduction circuit 94, an AGC (Auto Gain Control) circuit 95 and an A/D (Analog to Digital) converter 96.

The noise reduction circuit 94 takes charge of removing amplifier noises and reset noises among noises included iii the output signal of the CCD 91, that is, amplifier noises, shot noises and reset noises. The AGC circuit 95 amplifies and maintains signal level of the output of the noise reduction circuit 94 to a fixed level. Output of the AGC circuit 95 is converted into a digital signal of a certain bit width by the A/D converter 96 to be processed by the video processor 98. In the conventional CCD camera of FIG. 8, the video signal is output after converted into digital signal. However, analog signal may be output directly.

In the video processor 98, low-pass filtering, γ-correction, peak clipping, amplification and so on of the output of the signal processor 97 are performed for outputting a video signal to be represented on a display device.

Driving pulses $\phi H$, $\phi R$, and $\phi V$ for driving the CCD 91 are supplied from the CCD driver 92. The timing signal generator 93 generates timing signals such as a CCD driving pulse signal, a clock signal, or a sample-hold pulse signal to be delivered to each of the above parts.

The above described parts, that is, the signal processor 97, the video processor 98, the CCD driver 92 and the timing signal generator 93 are heretofore provided outside the CCD 91. However, personal video movies or digital cameras are widely spread recently, and more compact and economical equipment has become earnestly desired. For the purpose, circuit scale reduction and device miniaturization are actively pursued now.

As a prior art of the circuit scale reduction and the device miniaturization, configuration of the signal processor on the same semiconductor chip with the CCD is proposed in a Japanese patent application laid open as a Provisional Publication No. 259668/'89 in order to reduce the circuit scale and the cost as well of the solid-state camera.

FIG. 10 is a block diagram illustrating a solid-state camera of the prior art having a CCD 111 wherein a signal processor (frequency divider) 112 is included, and its peripheral circuits consisting of a vertical driver 113, horizontal driver 114, a generator of clock pulses and synchronous signals (hereafter abbreviated as SSCG) 117, a sub-carrier generator 118 and a video processor 119.

The solid-state camera of FIG. 10 operates as follows.

A clock pulse generator section (abbreviated as CG) 115 of the SSCG 117 generates CCD driving pulses ($\phi V$, $\phi H$ and $\phi R$) to be supplied to the vertical driver 113 and the horizontal driver 114. The vertical driver 113 and the horizontal driver 114 supply the CCD driving pulses after voltage-amplified. The frequency divider 112 configured on the CCD 111 generates a horizontal synchronous signal HD according to a reset pulse $\phi R$ of the CCD driving pulses, which is returned to a synchronous signal generator section (abbreviated as SSG) 116 of the SSCG 117. The sub-carrier generator 118 generates at color sub-carrier signal Fsc to be supplied to the video processor 119. The video processor 119 generates a video signal to be output from output of the CCD 111 by performing necessary processing ill the same way with the video processor 98 of FIG. 8.

As above described, a noise reduction is intended in the prior art by providing the frequency divider 112 separately from the SSCG 117 in order to prevent the CCD driving pulses to be affected from noises derived from the frequency divider 112, and a miniaturization of the equipment is realized as well by configuring the frequency divider 112 on the CCD 111.

Another prior art is disclosed in a Japanese patent application laid open as a Provisional Publication No. 184978/'86 and that of Provisional Publication No. 186080, wherein the A/D converter is configured on the CCD for the equipment miniaturization and the cost reduction.

FIG. 11 is a circuit configuration illustrating the A/D converter designed on the CCD described in the Provisional Publication No. 186080/'87.

Referring to FIG. 11, numerals 121 and 122 denote transfer electrodes of a charge coupled device each driven with each of transfer pulses $\phi 1$ and $\phi 2$. Between each pair of the transfer electrodes 121 and 122, floating electrodes 123 to 125 are inserted. The charge coupled device, a drain electrode 126 being provided for absorbing signal electrons at an end thereof, operates as a tapped delay line 127 halving tap electrodes charge-coupled therewith. Therefore, signal electrons transferred from the other end in a direction indicated by an allow 128 are transferred in the delay line 127 in order, and at the same time, they are detected nondestructively by the floating electrodes 123 to 125 each connected to an input terminal of each of analog comparators 129 to 131.

To another input terminal of each of the analog comparators 129 to 131, each of reference voltages obtained by dividing a main reference voltage with resisters 132 to 135 of the same resistance is supplied. That is, when potential of the maim reference voltage supplied to a terminal 136 is VR, potentials 3VR/4, VR/2 and VR/4 are impressed to the analog comparators 129 to 131, respectively.

Representing signal potential detected by the floating electrode 123 by VS, output C1 of the analog comparator 129 becomes at logic '1' (high level) when VS>3VR/4, and otherwise at logic '0' (low level). Other analog comparators 130 and 131 operate in the same way except for difference of the reference voltage VR/2 or VR/4. Therefore, logical outputs C1 to C3 of the analog comparators 129 to 131 are obtained as represented by following Table 1 according to value of the signal potential VS.

TABLE 1

| Condition | Comparative Output | | | Encoder Output | |
|---|---|---|---|---|---|
| | C1 | C2 | C3 | D1 | D2 |
| VS > 3VR/4 | 1 | 1 | 1 | 1 | 1 |
| 3VR/4 > VS > VR/2 | 0 | 1 | 1 | 1 | 0 |
| VR/2 > VS > VR/4 | 0 | 0 | 1 | 0 | 1 |
| VR/4 > VS | 0 | 0 | 0 | 0 | 0 |

That is, the outputs C1, C2 and C3 become all at logic '1' when VS>3VR/4, the outputs C2 and C3 being at logic '1' when 3VR/4>VS>VR/2, only the output C3 at logic '1' when VR/2>VS>VR/4 and none at logic '1' when VR/4>VS.

Each of the digital outputs C1 to C3 is then delayed through each of digital shifts registers 137 to 139 corresponding to detection timing of the same signal electrons of the floating electrode 123 to 125 delayed in the order by a clock cycle. By delaying each of the digital outputs C1, C2 and C3 for 3, 2 and 1 clock cycles by the digital shift registers driven by the same clock signal with that driving the delay line 127, the transfer delays are compensated. Thus, the digital outputs C1 to C3 of the same signal electrons are input to an encoder 140 ranged at the same timing, and converted into a binary code of two bits D1 and D2, as listed in Table 1.

Besides these prior arts, some examples are disclosed also in Japanese patent applications laid open as Provisional Publications No. 32776/'96 and No. 154980/'87. In the former document, a RAM (Read Only Memory) is configured on a CCD together with an A/D converter, and aln A/D converter is provided on the same semiconductor chip with a MOS type image sensor in the latter document.

However, there are following problems in these prior arts.

The first problem is that only a part of peripheral circuits is configured on the same semiconductor chip of the solid-state image sensor in every of the prior arts. Therefore, field adjustment of timing pulse phases or signal balance with external circuits outside the semiconductor chip has been inevitable for eliminating pulse delay differences, dulling of wave forms or ringing interferences caused by performance dispersion of active or passive elements of the external circuits or by wiring arrangement connecting them.

The second problem is that the miniaturization effect of the equipment is limited even when a part of peripheral circuits is configured on-chip. For replying to severe market requirement for the miniaturization, main part of the peripheral circuits should be configured together with the solid-state image sensor.

The third problem is that noises are susceptible to be mingled in the output signal of the CCD, even when the frequency divider is configured on the solid-state image sensor chip as described in the above Provisional Publication No. 259668/'89. The reason is that a long wiring is left needed for the high-impedance output signal of the CCD which is supplied to external circuit directly without signal processing. This makes noise performance easily dependent of length or path of wirings or arrangement of equipment parts.

SUMMARY OF THE INVENTION

Therefore, a primary object of the present invention is to provide a solid-state image sensor wherein is needed to field adjustment of timing pulse phases used in the signal processor or of signal balances. Another object of the invention is to provide a solid-state image sensor having noise performance more improved with a simple, miniaturized and economical configuration.

In order to achieve the objects, a solid-state image sensor of the invention comprises:

a CCD configured on a semiconductor chip for generating a CCD signal according to an optical image focused on a sensor area thereof;

an on-chip signal processor configured on the semiconductor chip by way of the same fabrication process with the CCD including a noise reduction circuit for eliminating noises from the CCD signal, and an AGC circuit for amplifying output of the noise reduction circuit; and a timing pulse generator configured on the semiconductor chip by way of the same fabrication process with the CCD for generating timing pulses used by the on-chip signal processor.

Therefore, uniformity of circuit elements can be easily attained, field adjustment of phases of timing pulses being made unnecessary, as well as realization of further miniaturization of the equipment. The noise performance is also improved, since wiring paths connecting circuit elements in the timing pulse generator and the on-chip signal processor can be shortened.

The on-chip signal processor may further comprise an A/D converter for converting output of the AGC circuit into a digital signal for enabling a user to select either of analog output or digital output.

BRIEF DESCRIPTION OF THE DRAWINGS

The foregoing, further objects, features, mid advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
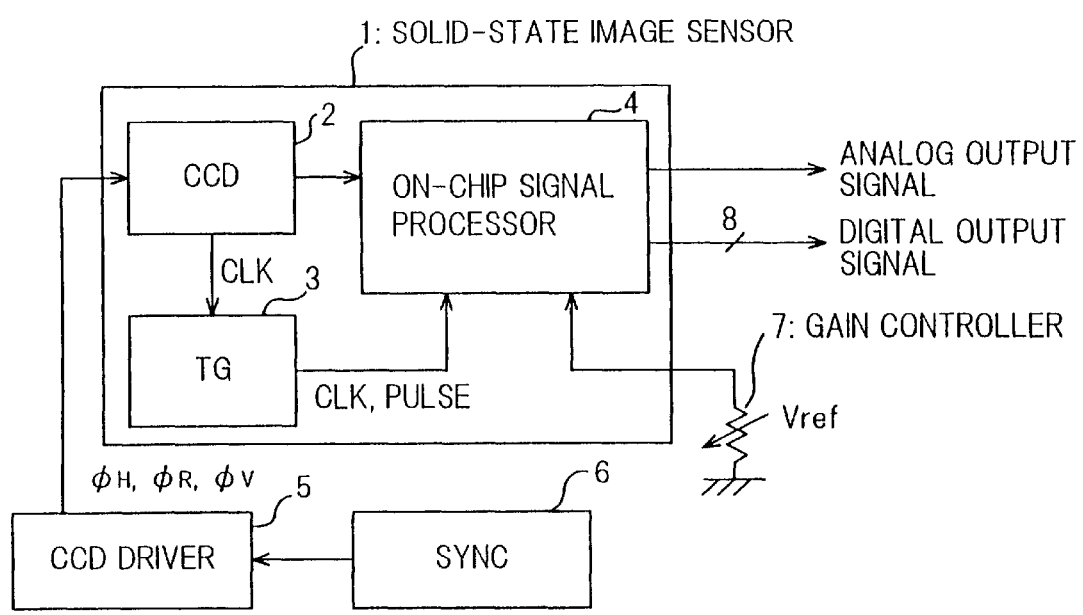
FIG. 1 is a block diagram illustrating a configuration of an embodiment of the invention.

FIG. 1 is a block diagram illustrating a configuration of an embodiment of the invention.

Referring to FIG. 1, a solid-state image sensor 1 according to the embodiment is configured on a semiconductor chip and comprises a CCD 2, a timing pulse generator (hereafter abbreviated as TG) 3 and an on-chip signal processor 4 including a noise reduction circuit, an auto gain control circuit (AGC) and an A/D converter.

Outside the solid-state image sensor 1, a CCD driver 5, a synchronous signal generator (hereafter abbreviated as SYNC) 6, and a gain controller 7 are provided.

CCD driving pulses (φV, φH and φR) are generated by the SYNC 6 and supplied to the CCD driver 5 to be voltage-amplified for driving the CCD 2 on the solid-state image sensor 1. Output signal of the CCD 2 is transferred to the on-chip signal processor 4, whereby processings of noise reduction, AGC and A/D conversion are performed to be output as a digital output signal as well as an analog output signal.

One of the CCD driving pulses supplied to the CCD 2, a horizontal driving pulse φH, for example, is delivered to the TG 3 as a clock signal CLK. By counting pulses of the clock signal CLK, that is, the horizontal driving pulse φH in the embodiment, the TG 3 generates various timing pulses used in the following on-chip signal processor 4.

Figure 2:
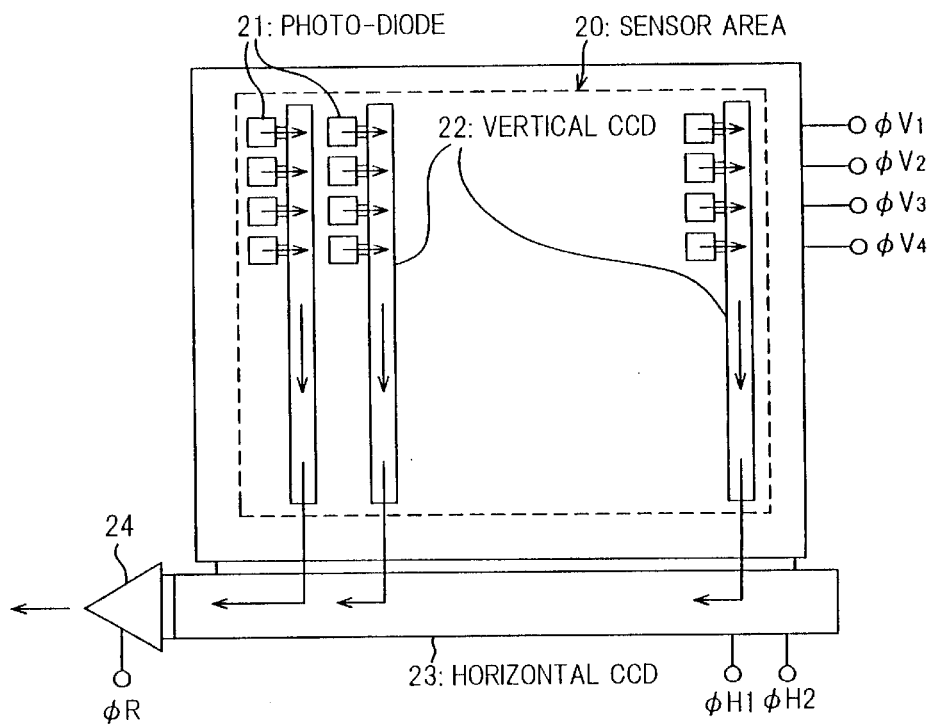
FIG. 2 is a schematic diagram illustrating the CCD 2 of FIG. 1.

Now, operation of the CCD 2 of FIG. 1 is described referring to a schematic diagram of FIG. 2.

An object image is focused on a sensor area (photoelectric transducer section) 20 of the CCD 2, and converted into electric charges corresponding to intensity of incident light by photo-diodes 21. Generated electric charges are transferred to vertical CCDs 22 through reading transfer gates. The vertical CCDs 22 are driven by vertical transfer pulses φV1 to φ4 and transfer the electric charges to a horizontal CCD 23 in order. The horizontal CCD 23 is driven by horizontal transfer pulses φH1 and φH2 and transfers the electric charges to an output amplifier 24 to be output. A reset pulse φR is supplied for resetting the output amplifier 104 from remaining charge for every pixel (photo-diode).

CCD signal output from the output amplifier 24 is transferred to the following on-chip signal processor 4.

Figure 3:
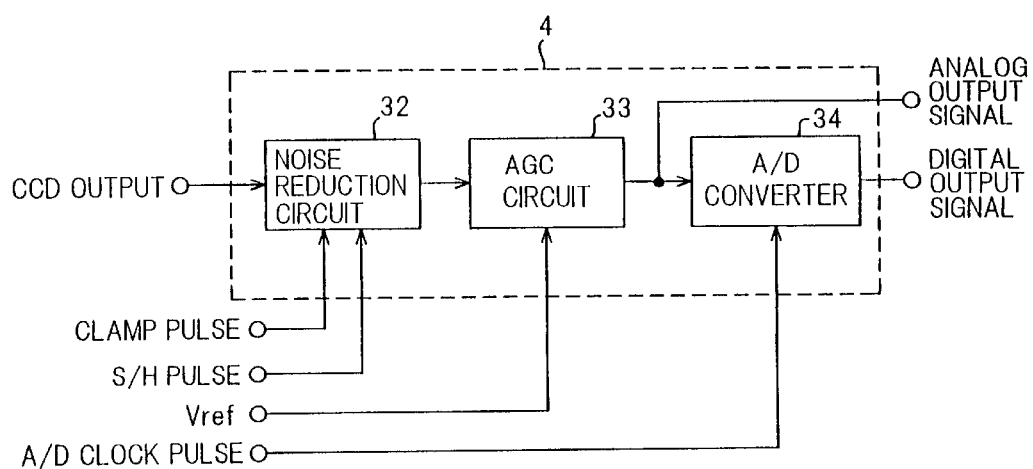
FIG. 3 is a block diagram illustrating detail of the on-chip signal processor of FIG. 1.

FIG. 3 is a block diagram illustrating detail of the on-chip signal processor 4, comprising a noise reduction circuit 32, an AGC circuit 33 and an A/D converter circuit 34.

The noise reduction circuit 32 takes charge of removing amplifier noises and reset noises among noises included in the output signal of the CCD 2, that is, amplifier noises, shot noises and reset noises. To the noise reduction circuit 32, a CDS (Correlated Double Sampling) circuit is applied, for example. The AGC circuit 33 amplifies and maintains signal level of the output of the noise reduction circuit 32 to a fixed level. Output of the AGC circuit 33 is converted into a digital signal of a certain bit width, 8 bits, for example, by the A/D converter 34.

Now, concrete examples of circuit elements of the on-chip signal processor 4 will be described.

Figure 4:
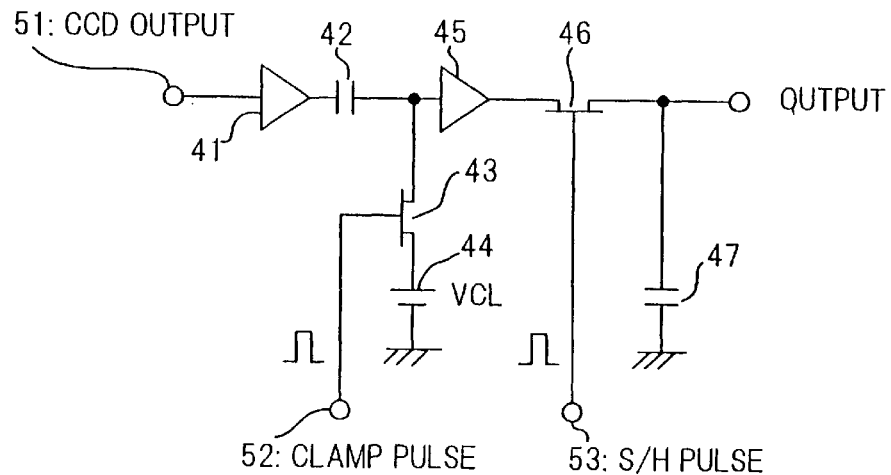
FIG. 4 is a circuit diagram illustrating configuration of the CDS circuit applied to the noise reduction circuit 32 of FIG. 3.

The noise reduction circuit 32 can be realized by way of the CDS circuit having at circuit configurational illustrated in FIG. 4, for example, comprising;

a first buffer 41 for buffering the CCD output 51 with a low impedance, a clamp condenser 42 for charging output of the first buffer 41 into a first electrode thereof, a transistor 43 for clamping potential of a second electrode of the clamp condenser 42 at a clamp level Vcl when it is made ON gated by a clamp pulse 52, a second buffer 45 for buffering potential of the second electrode of the clamp condenser 42 with a low impedance, a sampling transistor 46 for sampling output of the second buffer 45 when it is made ON gated by all S/H (Sample/Hold) pulse 53, and a hold condenser 47 for holding output of the second buffer 45 sampled by the sampling transistor 46.

Figure 5:
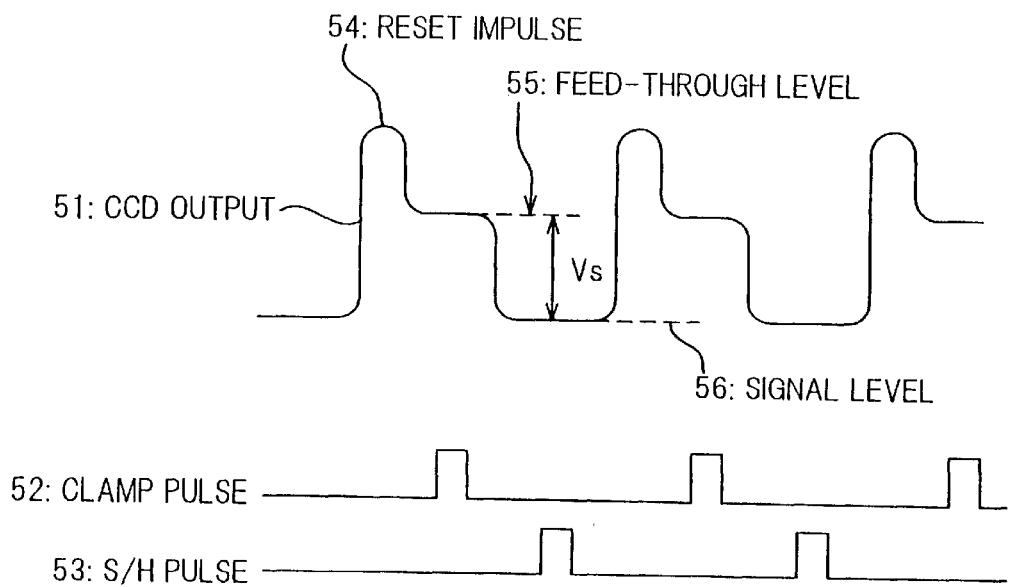
FIG. 5 is a timing chart illustrating operation of the CDS circuit of FIG. 4.

FIG. 5 is a timing chart illustrating operation of the CDS circuit of FIG. 4. In each cycle of the CCD output 51 corresponding to each pixel, the signal level is once maintained at a feed-through level 55 after a reset impulse 54 derived by the reset pulse φR, which is followed by a signal level 56 with a potential difference Vs representing each pixel charge. First, according to the clamp pulses 52 becoming at HIGH level at timings shown in FIG. 5, the clamp transistor 43 of FIG. 4 is turned to ON and clamps the feed-through level at a fixed DC level of the clamp level Vcl. Then input, and consequently, output of the second buffer 45 falls down by a signal level Vs from the clamp level, which is sampled by the sample transistor 46 turned to ON gated by the S/H pulse becoming at HIGH level at timings shown in FIG. 5, and charged into the hold condenser 47 to be output.

Thus, the reset noise and the amplifier noise component included in the feed-through level 55 and the signal level 56 are both eliminated and cancelled from the CCD output 51.

Figure 6:
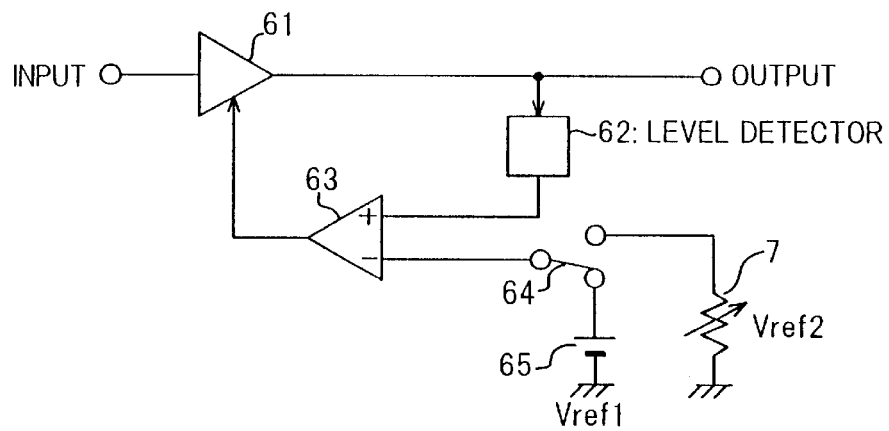
FIG. 6 is a block diagram illustrating configuration of the AGC circuit 33 of FIG. 3.

FIG. 6 is a block diagram illustrating configuration of the AGC circuit 33 comprising;

a variable gain amplifier 61 for amplifying input signal to a fixed level, a level detector 62 which detects mean level of the output signal amplified by the variable gain amplifier 61 by integrating the signal level for a certain period, for example, a comparator 63 whereof an input terminal is supplied with output of the level detector 62, and a switch 64 connected to another input terminal of the comparator 63 for selecting either of a prefixed reference voltage Vref1 or at variable reference voltage Vref2 supplied from the gain controller 7.

The comparator 63 outputs ant AGC control signal for controlling the variable amplifier 61 so that the output of the level detector 62 coincide to the prefixed reference voltage Vref1 or the variable reference voltage Vref2, by comparing them. Thus, the output signal level of the variable amplifier 61 is controlled to maintain a fixed level by way of a feedback loop consisting of the variable amplifier 61, the level detector 62 and the comparator 63.

Figure 7:
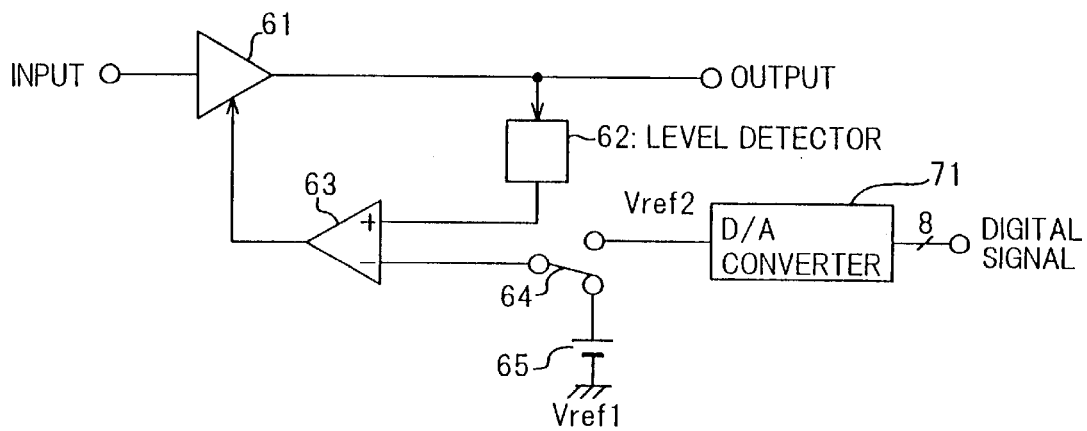
FIG. 7 is a block diagram illustrating another configuration of the AGC circuit 33 of FIG. 3.
Figure 8:
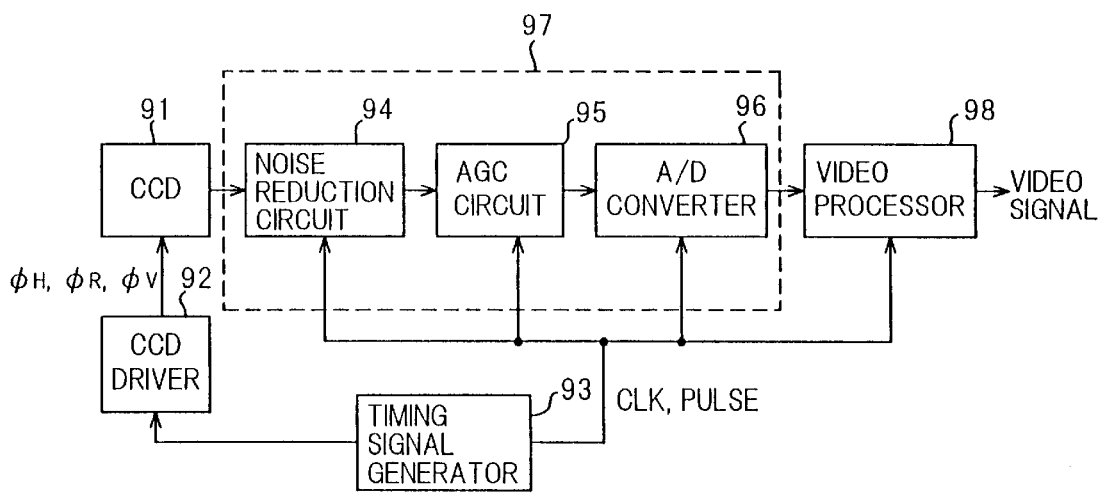
FIG. 8 is a block diagram illustrating a conventional solid-state camera.
Figure 9:
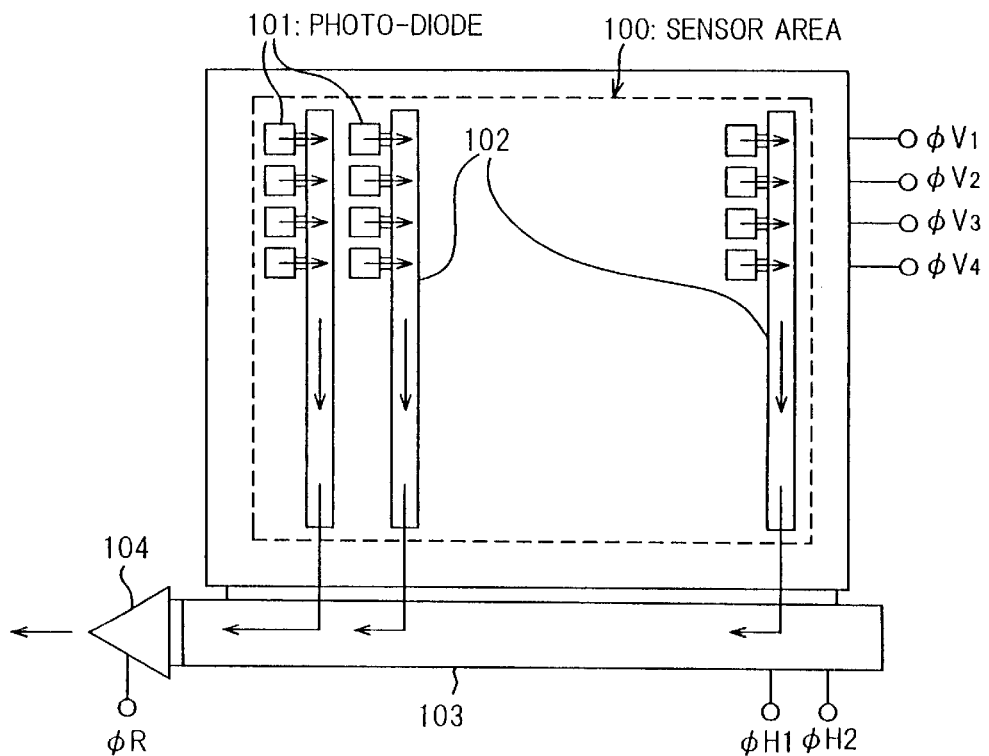
FIG. 9 is a schematic diagram illustrating a configuration of the CCD 91 of FIG. 8.
Figure 10:
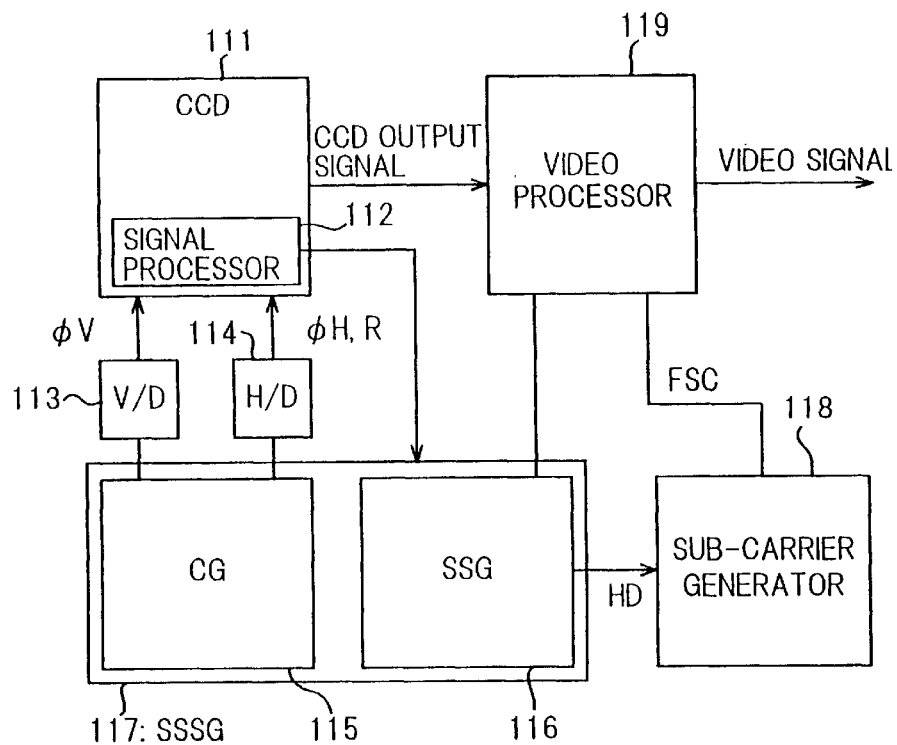
FIG. 10 is a block diagrams illustrating a solid-state camera of another prior art.
Figure 11:
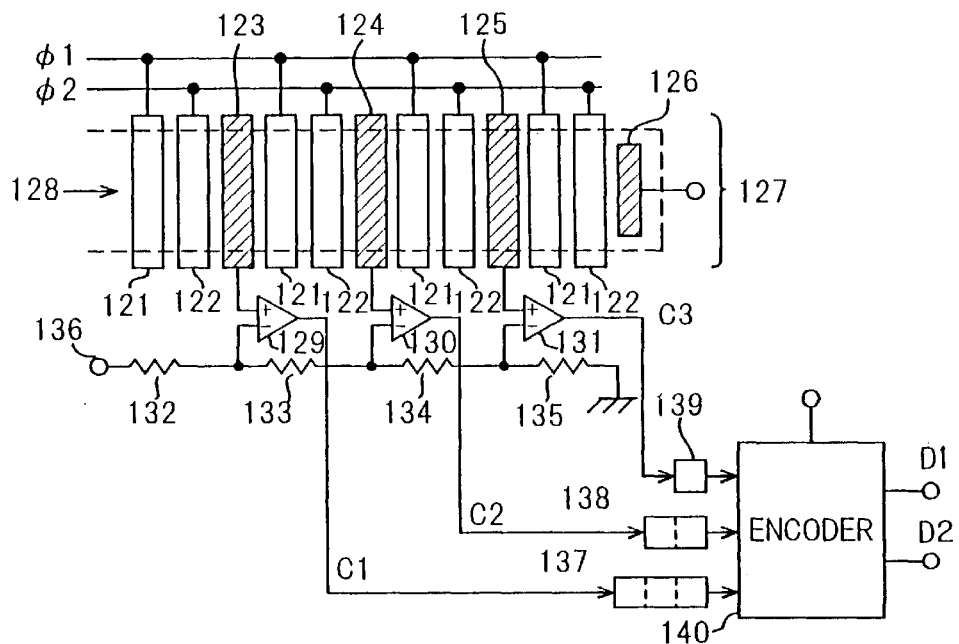
FIG. 11 is a circuit configuration illustrating the A/D converter designed on the CCD according to still another prior art.

In the above example, the external reference voltage Vref2 is described to be supplied from an analog gain controller circuit. However, it may be controlled with a digital signal by further providing a D/A (Digital to Analog) converter 71 as illustrated in FIG. 7. As to the D/A converter 71, any appropriate con-conventional D/A converter can be applied.

Returning to FIG. 3, output of the AGC circuit 33 thus obtained is output directly as an analog output signal, and at the same time, supplied to the A/D converter 34 to be converted into a digital output signal. As to also the A/D converter 34 of FIG. 3, any appropriate conventional A/D converter can be applied.

Thus, the analog output signal and the digital output signal of the solid-state image sensor 1 of the embodiment are obtained, so that either thereof may be used according to circuit configuration of video processor wherein low-pass filtering, γ-correction, peak clipping, amplification and so on are to be performed. However, the A/D converter 34 may be avoided when the digital output is not necessary.

The TG 3 and the on-chip signal processor 4 can be configured on the same semiconductor chip by way of the same MOS fabrication process at the same time with the CCD 2.

As heretofore described, the solid-state image sensor 1 of the invention has following merits.

1. Field adjustment of phases of timing pulses is made unnecessary, since uniformity of circuit elements can be easily attained by configuring the timing pulse generator 3 and the on-chip signal processor 4 on the same semiconductor chip by way of the same MOS fabrication process with the CCD 2.

2. Further miniaturization of the equipment can be realized, since the timing pulse generator 3 and the signal processor 4 including all necessary circuit elements except for the CCD driver circuit 5 and the SYNC 6 are configured on the solid-state image sensor 1.

3. The noise performance is improved, since wiring paths connecting circuit elements in the timing pulse generator 3 and the on-chip signal processor 4 can be shortened.

4. Clock noises because of interference from high-frequency clock signal are reduced, since the timing pulse generator 3 is clocked directly with a driving pulse of the CCD 2, avoiding additional wiring for supplying a clock signal to the timing pulse generator 3 from outside.

5. Output signal level can be controlled optionally from outside, since reference voltage of the AGC circuit 33 can be controlled by an analog or digital external signal.

What is claimed is:

1. A solid-state image sensor comprising:
   a CCD (Charge Coupled Device) having a horizontal CCD and a vertical CCD configured on a single semiconductor chip for generating a CCD signal according to an optical image focused on a sensor area thereof;
   an on-chip signal processor configured on the semiconductor chip by way of the same fabrication process with the CCD including at least a noise reduction circuit for eliminating noise from the CCD signal and an AGC (Automatic Gain Control) circuit for amplifying output of the noise reduction circuit; and
   a timing pulse generator configured on the semiconductor chip by way of the same fabrication process with the CCD for generating timing pulses used by the on-chip signal processor.

2. The solid-state image sensor recited in claim 1, said on-chip signal processor further comprising an A/D (Analog to Digital) converter for converting output of the AGC circuit into a digital signal.

3. The solid-state image sensor recited in claim 1, wherein one of CCD driving pulses supplied from an external circuit for driving the CCD is directly supplied to the timing pulse generator as a clock signal used in the timing pulse generator.

4. The solid-state image sensor recited in claim 1, wherein gain of the AGC circuit is designed to be controlled by an analog signal delivered from an external circuit.

5. The solid-state image sensor recited in claim 1, wherein gain of the AGC circuit is designed to be controlled by a digital signal delivered from an external circuit.

6. The solid-state image sensor recited in claim 2, wherein either of output of the AGC circuit or output of the A/D converter is selected to be used.

7. A solid-state image sensor comprising:
   CCD (Charge Coupled Device) having a horizontal CCD and a vertical CCD configured on a single semiconductor chip for generating a CCD signal according to an optical image focused on a sensor area thereof;
   an on-chip signal processor configured on the semiconductor chip by way of a same MOS fabrication process with the CCD including at least a noise reduction circuit for amplifying output of the noise reduction circuit; and
   a timing pulse generator configured on the semiconductor chip by way of the same fabrication process with the CCD for generating timing pulses used by the on-chip signal processor.

8. The solid-state image sensor recited in claim 7, said on-chip signal processor further comprising an A/D (Analog to Digital) converter for converting output of the AGC circuit into a digital signal.

9. The solid-state image sensor recited in claim 7, wherein one of CCD driving pulses supplied from an external circuit for driving the CCD is directly supplied to the timing pulse generator as a clock signal used in the timing pulse generator.

10. The solid-state image sensor recited in claim 7, wherein gain of the AGC circuit is designed to be controlled by an analog signal delivered from an external circuit.

11. The solid-state image sensor recited in claim 7, wherein gain of the AGC circuit is designed to be controlled by a digital signal delivered from an external circuit.

12. The solid-state image sensor recited in claim 8, wherein either of output of the AGC circuit or output of the A/D converter is selected to be used.

\* \* \* \* \*

UNITED STATES PATENT AND TRADEMARK OFFICE
CERTIFICATE OF CORRECTION

PATENT NO. : 6,940,553 B1
APPLICATION NO. : 09/013084
DATED : September 6, 2005
INVENTOR(S) : Katoh Page 1 of 1

It is certified that error appears in the above-identified patent and that said Letters Patent is hereby corrected as shown below:

On Title page (item 57), line 16, "used the on-chip" should be --used by the on-chip--.
Claim 7, Col. 8, line 18, "CCD" should be -- a CCD --.
Claim 7, Col. 8, line 25, "circuit for amplifying" should be --circuit for eliminating noise from the CCD signal and an AGC (Automatic Gain Control) circuit for amplifying--.

Signed and Sealed this

Fifteenth Day of August, 2006

JON W. DUDAS
*Director of the United States Patent and Trademark Office*